United States Patent [19]

Koyama

[11] Patent Number: 4,589,045
[45] Date of Patent: May 13, 1986

[54] STATE INDICATOR DEVICE FOR INDICATING STATES OF RECORDING AND TAPE

[75] Inventor: Tsuneyuki Koyama, Yokohama, Japan

[73] Assignee: Victor Company of Japan, Ltd., Yokohama, Japan

[21] Appl. No.: 496,128

[22] Filed: May 19, 1983

[30] Foreign Application Priority Data

May 21, 1982 [JP] Japan .................................. 57/85708

[51] Int. Cl.⁴ ............................................ G11B 15/00
[52] U.S. Cl. .................................... 360/137; 360/90
[58] Field of Search ................. 360/137, 74.2, 31, 60, 360/62, 69, 74.1, 90

[56] References Cited

U.S. PATENT DOCUMENTS

| 4,003,093 | 1/1977 | Satoh | 360/137 |
| 4,331,307 | 5/1982 | Furuta | 242/186 |
| 4,340,951 | 7/1982 | Motoyama et al. | 369/53 |

FOREIGN PATENT DOCUMENTS

| 2337619 | 2/1975 | Fed. Rep. of Germany | 360/14.1 |
| 55-132545 | 10/1980 | Japan | 360/69 |
| 56-13538 | 2/1981 | Japan | 360/69 |
| 56-22236 | 3/1981 | Japan | 360/69 |
| 56-43297 | 9/1982 | Japan | 360/69 |
| 57-169979 | 10/1982 | Japan | 360/90 |

*Primary Examiner*—A. J. Heinz
*Assistant Examiner*—Benjamin E. Urcia
*Attorney, Agent, or Firm*—Michael N. Meller

[57] ABSTRACT

A state indicator device in a recording and/or reproducing apparatus comprises a circuit for generating a mute control signal which causes muting of a recording signal until the traveling speed of the tape reaches a predetermined tape travel speed for recording the signal, a logic circuit supplied with a tape traveling signal, a recording mode signal, and the mute control signal, for producing a first driving signal for causing continuous emission of light when the recording mode signal exists and the mute control signal is in a signal state for muting the recording signal and producing a second driving signal in accordance with the tape traveling signal when the recording mode signal exists and the mute control signal is in a signal state for cancelling the muting of the recording signal, and a single indicator element for continuously emitting light in response to the first driving signal and blinking in response to the second driving signal.

9 Claims, 11 Drawing Figures

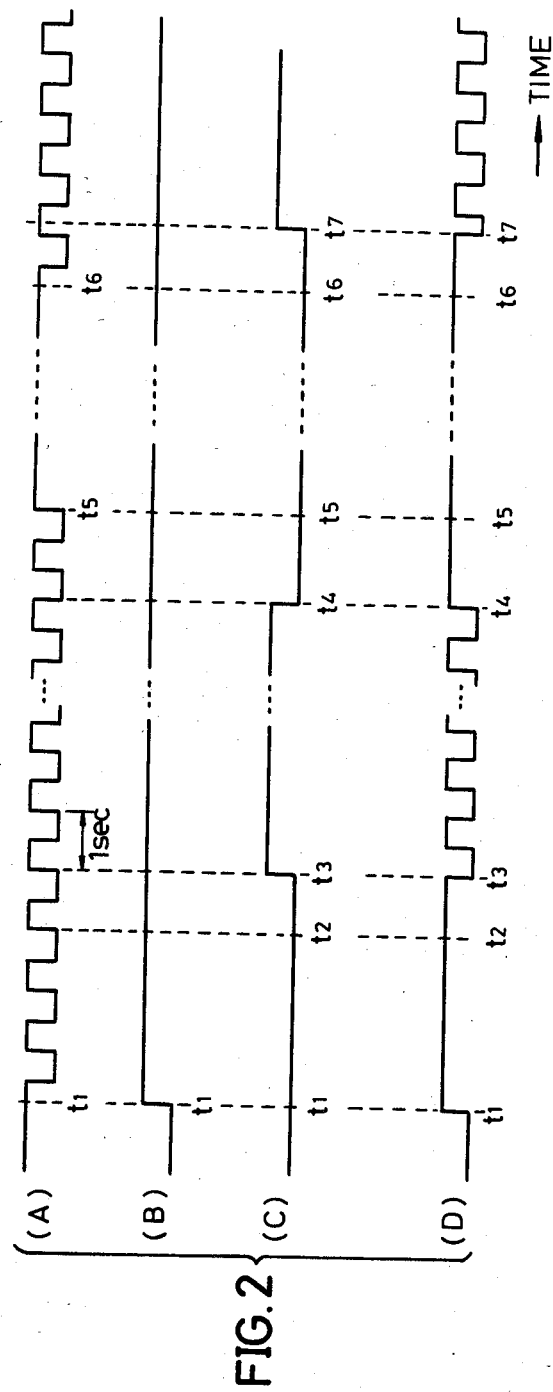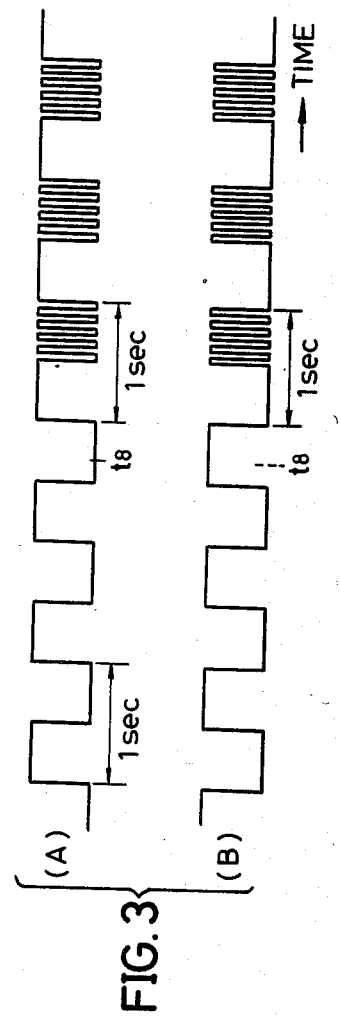
FIG. 2
FIG. 3

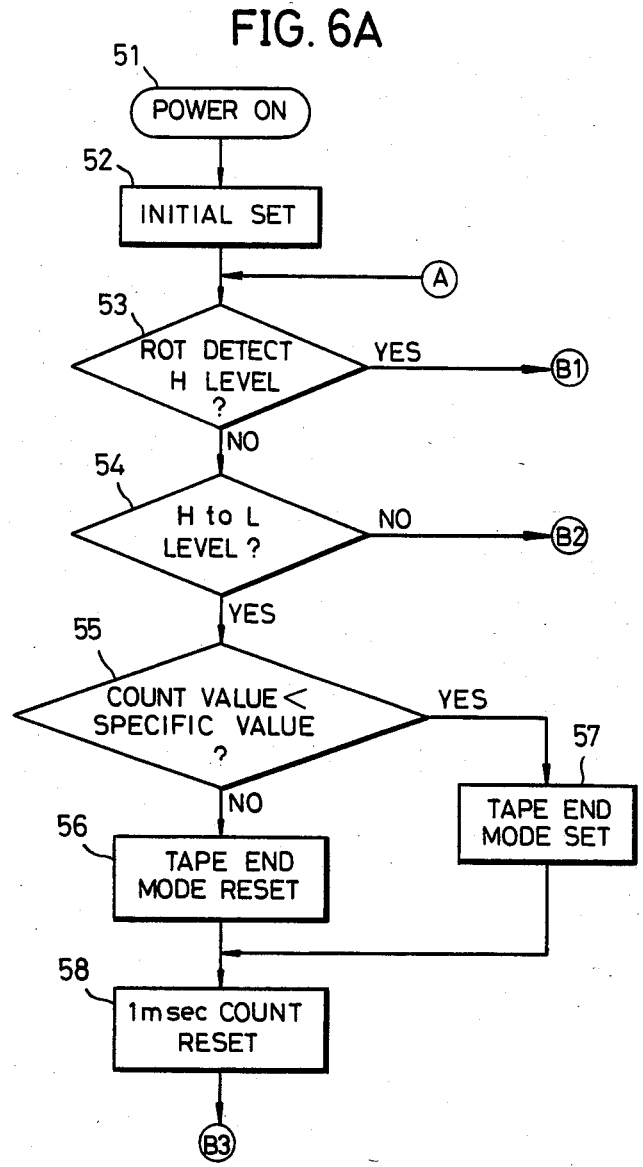

STATE INDICATOR DEVICE FOR INDICATING STATES OF RECORDING AND TAPE

BACKGROUND OF THE INVENTION

The present invention generally relates to state indicator devices for indicating the state of recording and the state of the tape, and more particularly to a state indicator device capable of providing an indication that a signal is being recorded onto a traveling tape and a warning indication that a quantity of remaining tape has become less than a predetermined quantity, by use of a single indicator element.

In a conventional video signal recording and/or reproducing apparatus which records and/or reproduces a video signal onto and/or from a tape, an indicator device was provided for indicating the state of recording and the state of the tape. This indicator device included two indicator elements, that is, a first indicator element for indicating that the apparatus is in a recording mode, and a second indicator element for indicating that the tape was traveling. However, in such a conventional apparatus, two indicator elements were required, and driving circuits exclusively for the respective indicator elements had to be provided. As a result, considerable space was required for mounting the indicator device, and posed a problem when downsizing the whole apparatus.

In the above conventional indicator device, the second indicator element blinked to indicate that the tape was traveling regardless of whether the recording and/or reproducing apparatus was in the recording mode or the reproducing mode, as long as the tape was traveling. However, when the recording and/or reproducing apparatus is in the reproducing mode and reproduction is being carried out with respect to the traveling tape, it can easily be detected that the recording and/or reproducing apparatus is in the reproducing mode by watching the reproduced picture or listening to the reproduced sound. Accordingly, it is unnecessary for the second indicator element to indicate the tape travel by blinking during the reproducing mode, and it would be rather irritating to the operator if such blinking indication were provided.

Further, in the video signal recording and/or reproducing apparatus, and particularly in a video signal recording and/or reproducing apparatus which records an image-picked up video signal from a television camera onto the tape, the apparatus is frequently operated in a manner such that the recording operation is temporarily stopped during the recording and the recording operation is resumed thereafter. It is common to operate the apparatus in this manner when using a portable television camera and recording the picked up video signal onto the tape by a portable recording and/or reproducing apparatus.

When an operation is carried out to temporarily stop the tape travel in order to temporarily stop the recording operation while recording the image-picked up video signal from the television camera related to a certain picture, the tape travel does not stop immediately due to inertia of a tape feeding system. As a result, the tape stops after traveling over a certain distance. Further, when resuming the tape travel so as to resume the recording, it will take a certain time period for the tape traveling speed to reach a predetermined tape travel speed. Accordingly, if the recording is resumed immediately by simply resuming the tape travel from a position where the tape stopped, stable recording cannot be carried out during the initial period of the resumed recording. Thus, if a tape recorded in this manner is reproduced, the servo operation becomes unstable at a joint part of the recording, that is, at the part where the recording is temporarily stopped and then resumed thereafter, and there will be a problem in that the reproduced picture will become distorted. In addition, if the recording is resumed after the tape travel is resumed and the tape travel speed has reached the predetermined tape travel speed, an unrecorded part will be formed on the tape between the previously recorded part and the part which is next recorded, and the reproduced picture will become unsatisfactory for viewing.

In order to prevent such problems from being introduced, it is necessary to automatically rotate a supply reel in a tape take-up direction and rewind the tape by a predetermined quantity before stopping the tape, when temporarily stopping the recording operation. By taking such measures and resuming the recording thereafter, the tape which has been stopped will have reached the predetermined tape travel speed when the recording with respect to the tape is started by heads.

While the tape is rewound after the tape travel is temporarily stopped, and during the initial stage of the resumed recording, the recording is not carried out although the tape travels. However, according to the conventional indicator device, the second indicator element blinks to indicate the tape travel during these intervals although the recording is not being carried out. Such indication of the tape travel during the interval in which the recording is not carried out is meaningless, and the indication need only be provided while the recording is being carried out.

In addition, there conventionally was no useful indicator device having a simple construction, for providing a warning indication that the quantity of remaining tape is small.

SUMMARY OF THE INVENTION

Accordingly, it is a general object of the present invention to provide a novel and useful state indicator device for indicating states of recording and tape, in which the above described problems have been eliminated.

Another and more specific object of the present invention is to provide a state indicator device capable of independently indicating a state when the recording is not being carried out although the recording and/or reproducing apparatus is in a recording mode, and a state where the recording and/or reproducing apparatus is in the recording mode, the tape is traveling, and the recording is being carried out, by use of a single indicator element.

Still another object of the present invention is to provide a state indicator device capable of additionally indicating that the quantity of remaining tape has become less than a predetermined quantity by use of the above single indicator element.

Other objects and further features of the present invention will be apparent from the following detailed description when read in conjunction with the accompanying drawings.

BRIEF DESCRIPTION OF THE DRAWINGS

FIGS. 2(A) through 2(D) are graphs respectively showing signal waveforms for explaining the operation of the state indicator device according to the present invention when indicating a recording state;

FIGS. 3(A) and 3(B) are graphs respectively showing signal waveforms for explaining the operation of the state indicator device according to the present invention when indicating the quantity of remaining tape;

FIGS. 6A and 6B respectively are flow charts for explaining the operation of a second microcomputer shown in FIG. 1.

DETAILED DESCRIPTION

Figure 1:
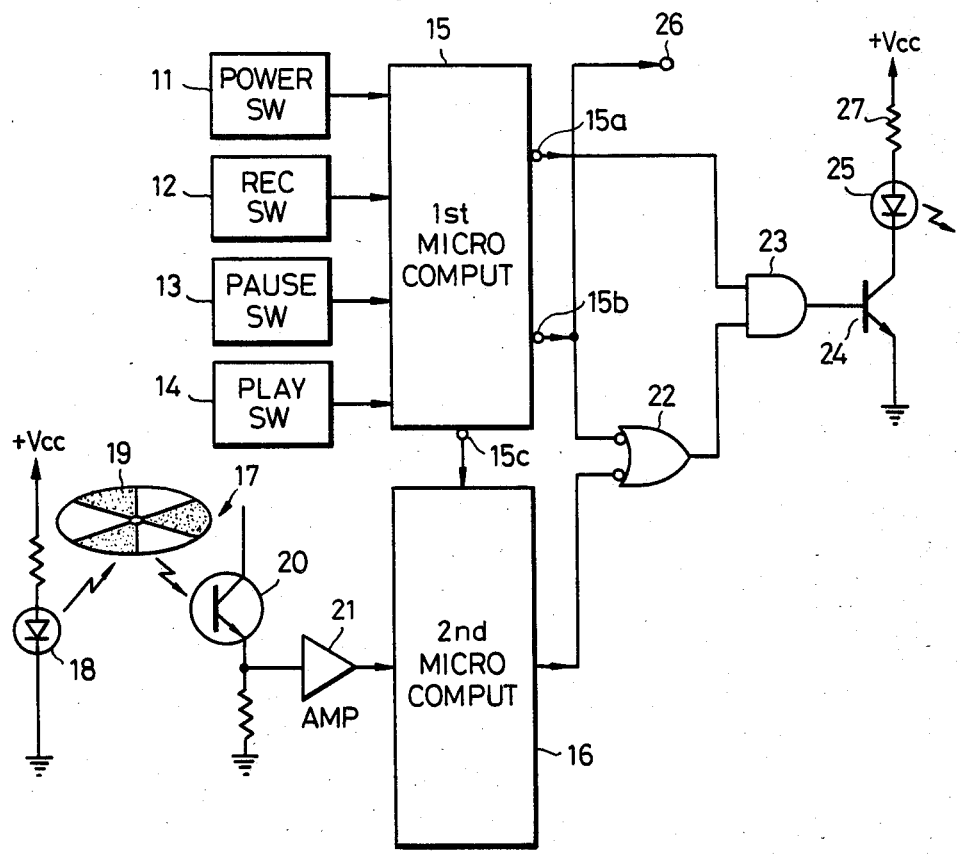
FIG. 1 is a systematic circuit diagram showing an embodiment of a state indicator device according to the present invention.
Figure 4:
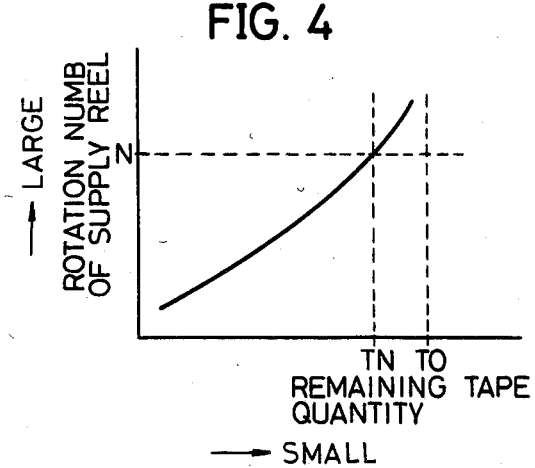
FIG. 4 is a graph for explaining the detecting operation for detecting the quantity of remaining tape.

In FIG. 1, a power source switch 11, a recording switch 12, a pause switch 13, and a play switch 14 are respectively connected to a first microcomputer 15. An output of a rotation detecting device 17 is supplied to a second microcomputer 16, through an amplifier 21. The rotation detecting device 17 comprises a light-emitting element 18, a reflecting plate 19 which rotates unitarily with a reel disc of a supply reel, and a photosensitive element 20. Light reflecting parts and non-reflecting parts are alternately arranged on the reflecting plate 19, and the photosensitive element 20 receives the light which is emitted from the light-emitting element 18 and reflected at the reflecting plate 19. The photosensitive element 20 produces an output when it receives light. Accordingly, the photosensitive element 20 produces a square wave signal having a frequency which is proportional to the rotation number of the supply reel. The rotation number of the supply reel varies according to the quantity of tape wound around thereon, that is, the diameter of the tape roll thereof, as shown in FIG. 4. Thus, the output frequency of the rotation detecting device 17 also varies according to the diameter of the tape roll on the supply reel; however, the second microcomputer 16 receives the output of the rotation detecting device 17 and produces a square wave signal having a period in the range of one second until the output frequency of the rotation detecting device 17 reaches a frequency corresponding to a rotation number N of the supply reel which will be described hereinafter.

Figure 5:
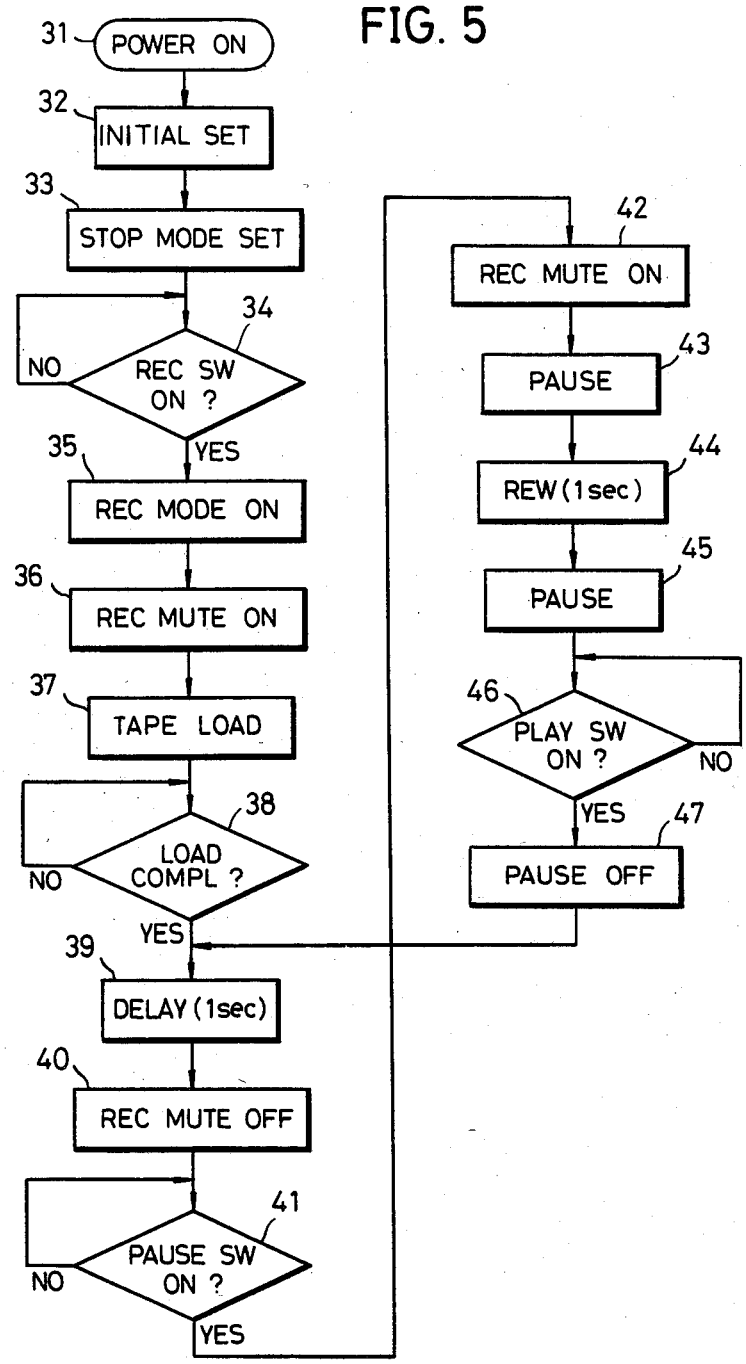
FIG. 5 is a flow chart for explaining the operation of a first microcomputer shown in FIG. 1.

First, when the power source switch 11 is turned ON prior to the recording operation, the power source is turned ON by the first microcomputer 15 at a step 31 in the flow chart shown in FIG. 5. Initial setting is carried out at a step 32, and a stop mode is set at a step 33. A step 34 discriminates whether the recording switch 12 is ON. The result of the discrimination at the step 34 is "NO" if the recording switch 12 is OFF, and the discrimination is continuously carried out at the step 34 until the discrimination result becomes "YES". When the recording switch 12 is turned ON at a time t1 in order to start the recording operation, the discrimination result at the step 34 becomes "YES", and the recording mode is set at a step 35, that is, the recording mode becomes ON. When the recording mode is ON, a high-level recording mode signal is obtained from an output terminal 15a of the first microcomputer 15 and supplied to one input terminal of an AND-gate 23. The AND gate 23 is enabled when this high-level recording mode signal is applied.

The recording mute mode is set, that is, the recording mute becomes ON, at a step 36. When the recording mute mode is ON, a low-level mute signal is obtained from an output terminal 15b of the first microcomputer 15. The output level at the output terminal 15b is high when the recording mute mode is OFF. The recording mute signal obtained from the output terminal 15b is applied to one input terminal of a NAND gate 22. On the other hand, the recording mute signal is also supplied to a recording amplifier (not shown) through a terminal 26 in order to carry out a muting operation, so that the recording signal is not supplied to rotary heads.

In this state, the detection output of the rotation detecting device 17 continues to assume a specific value because the tape is not traveling, and a high-level signal from the second microcomputer 16 is applied to the other input terminal of the NAND gate 22. Since the level of the signal applied to the NAND gate 22 from the output terminal 15b is low in this state, the output level of the NAND gate 22 is high. This high-level output of the NAND gate 22 is applied to the other input terminal of the AND gate 23. Because the high-level signal from the output terminal 15a is applied to the AND gate 23 in this state, the output level of the AND gate 23 is high, and this high-level output of the AND gate 23 is applied to the base of a transistor 24 which has its emitter grounded to turn this transistor 24 ON. An indicator element 25 consisting of a single light-emitting diode is connected in series with a resistor 27, between the collector of the transistor 24 and a power source voltage $+V_{cc}$. Accordingly, the indicator element 25 is turned ON and emits light when the transistor 24 becomes ON.

Next, a tape loading mechanism is operated at a step 37. Thus, the tape loading mechanism draws the tape out of a tape cassette to load the tape onto a predetermined tape path, and also starts the tape travel. A step 38 discriminates whether the loading of the tape has been completed, and the result of the discrimination becomes "YES" when the loading of the tape is completed. The discrimination is continued at the step 38 until the discrimination result becomes "YES". When the discrimination result at the step 38 becomes "YES", a subsequent step 39 performs a delay of approximately one second, and a step 40 turns the recording mute mode OFF at a time t3. When the recording mute mode becomes OFF, approximately one second has elapsed from the time when the tape travel is started and the tape travel speed has already reached a predetermined tape travel speed, and the recording of the signal is carried out with respect to the tape which is traveling at the predetermined tape travel speed by the rotary heads. A step 41 discriminates whether the recording pause switch 13 is turned ON. The discrimination result at the step 41 is "NO" if the recording pause switch 13 is OFF, and the discrimination is continued until the discrimination result becomes "YES".

The tape travels while the tape is being loaded by the tape loading mechanism after the recording switch 12 is turned ON at the time t1, and also after the tape loading operation is completed. Accordingly, the second microcomputer 16 produces a square wave signal shown in FIG. 2(A) having a frequency of approximately 1 Hz (0.8 Hz to 1.2 Hz in reality) according to the output of the rotation detecting device 17, and supplies this square wave signal to the NAND gate 22. After the time t1, a signal shown in FIG. 2(B) which assumes a high level during the recording mode is obtained from the output terminal 15a of the first microcomputer 15, and supplied to the AND gate 23. In addition, if the recording mute mode was ON before the time t1, a low-level signal shown in FIG. 2(C) continues to be supplied to the NAND gate 22 until the time t3. If the recording mute mode was OFF before the time t1, the low-level signal shown in FIG. 2(C) is then supplied to the NAND gate 22 from the time t1 to the time t3.

During an interval between the times t1 and t3, that is, the interval in which the recording and/or reproducing apparatus is in the recording mode and the tape is traveling but the recording mute mode is ON and the recording by the heads has not been started, the signal level at one input terminal of the NAND gate 22 remains low. Hence, even if the signal at the other input terminal of the NAND gate 22 repeatedly assumes high and low levels, the output level of the NAND gate 22 remains high regardless of such signal applied to the other input terminal of the NAND gate 22. Moreover, because the signal level at one input terminal of the AND gate 23 is also high, the output level of the AND gate 23 remains high. As a result, the indicator element 25 emits light continuously as shown in FIG. 2(D). Due to this continuous emission of light by the indicator element 25, it may be discriminated that the recording is not being carried out on the tape although the recording and/or reproducing apparatus is in the recording mode.

At the time t3 when the recording mute mode becomes OFF, the output level at the output terminal 15b of the first microcomputer 15 becomes high. Hence, after the time t3, a signal obtained from the NAND gate 22 is a signal having an inverted waveform of the signal waveform shown in FIG. 2(A) which is supplied to the NAND gate 22 from the second microcomputer 16. Accordingly, after the time t3 when the recording by the rotary heads has been started, the base of the transistor 24 is alternately applied with a high-level signal and a low-level signal with a period of one second, that is, for every 0.5 second, and the transistor 24 thus repeats ON and OFF states. Therefore, the indicator element 25 repeatedly blinks with a period of one second as shown in FIG. 2(D). Due to this repetitive blinking of the indicator element 25 with a specific period, it may be discriminated that the tape is traveling normally and the recording is being carried out by the rotary heads. Further, as will be described hereinafter, such indication by the indicator element 25 indicates that a quantity of tape corresponding to over one minute in recording time still remains available for recording.

The recording pause switch 13 shown in FIG. 1 is pushed when interrupting the recording at a time t4 during the recording. By the manipulation of the recording pause switch 13, the discrimination result at the step 41 shown in FIG. 5 of the first microcomputer 15 becomes "YES", and the recording mute mode becomes ON at a subsequent step 42 to interrupt the supply of the recording signal to the heads. The tape travel in the forward direction is stopped when a pause operation is carried out at a step 43, however, the tape is immediately rewound in the reverse direction for one second at a step 44. Thereafter, a pause operation is carried out at a step 45 to stop the tape travel. A subsequent step 46 discriminates whether the play switch 14 has been turned ON, and the discrimination result is "NO" if the play switch 14 is not ON. The discrimination is continuously carried out at the step 46 until the discrimination result becomes "YES". Further, when the recording pause switch 13 is turned ON, a recording pause signal is produced through an output terminal 15c of the first microcomputer 15 and supplied to the second microcomputer 16.

As described heretofore, when the recording mute mode becomes ON after the time t4, the output obtained through the output terminal 15b of the first microcomputer 15 assumes a low level as shown in FIG. 2(C). Accordingly, the output of the NAND gate 22 assumes a high level regardless of the output of the second microcomputer 16 shown in FIG. 16, and the indicator element 25 continues to blink after the time t4 as shown in FIG. 2(D). Thus, it can be discriminated from the indication of the indicator element 25 that the recording and/or reproducing apparatus is in the recording mode but the recording is not being carried out with respect to the tape.

The tape travel does not stop immediately and overruns after the time t4, and the tape travel stops at a time t5 after being rewound as described before. During the interval between the times t4 and t5, the tape travels and the square wave output shown in FIG. 2(A) is obtained from the second microcomputer 16. Moreover, this square wave output assumes a high level after the time t5 as shown in FIG. 2(A). However, the recording is not carried out after the time t4, and the indicator element 25 continues to blink as the output obtained through the output terminal 15b of the first microcomputer 15 assumes a low level.

Next, when the play switch 14 shown in FIG. 1 is turned ON at a time t6 so as to resume the recording, the discrimination result at the step 46 becomes "YES". As a result, the pause mode becomes OFF at a subsequent step 47, and the tape starts to travel in the forward direction. After the step 47 is carried out, the operation returns to the step 39 wherein the delay of one second is carried out, and thereafter, the recording mute mode becomes OFF at the step 40. Accordingly, at a time t7, that is, at the time after the play switch 14 is turned ON and one second has elapsed from the time when the pause mode becomes OFF, the recording mute mode becomes OFF and the recording of the signal onto the tape by the heads is resumed. As described before, the step 41 is thereafter carried out to discriminate whether the recording pause switch 13 has been turned ON.

Because the recording mute mode is still ON when the play switch 14 is turned ON at the time t6, the output obtained through the output terminal 15b of the first microcomputer 15 still assumes a low level. Hence, the tape starts to travel from the time t6 and the square wave signal shown in FIG. 2(A) is again produced from the second microcomputer 16; however, the output of the NAND gate 22 continues to assume a high level and the indicator element 25 thus continues to assume a the state where the light is emitted continuously.

On the other hand, when the recording mute mode is turned OFF at the time t7, the output obtained through the output terminal 15b of the first microcomputer 15 assumes high level as shown in FIG. 2(C). Accordingly, a square wave signal having an inverted signal waveform of the output signal of the second microcomputer 16 shown in FIG. 2(A), is produced from the NAND gate 22 after the time t7. As a result, the indicator element 25 repeatedly blinks after the time t7 with a specific period as shown in FIG. 2(D), and it may be discriminated that the tape is traveling normally and the recording of the signal onto the tape is being carried out.

As the recording is carried out and the tape travels, the quantity of tape wound around the supply reel decreases and the diameter of the tape roll on the supply reel decreases. Hence, as shown in FIG. 4, the rotation number of the supply reel increases as the tape travels. In FIG. 4, a quantity T0 of remaining tape wound around the supply reel corresponds to the terminal end of the tape when all of the tape is taken up from the supply reel, that is, when the quantity of remaining tape on the supply reel is zero. On the other hand, a quantity TN of remaining tape on the supply reel corresponds to a quantity of remaining tape on the supply reel at a point in time, for example, one minute before all of the tape is taken up from the supply reel and the terminal end of the tape is reached. The second microcomputer 16 assumes that the rotation number of the supply reel assumes a threshold value N when the quantity of remaining tape on the supply reel is equal to TN, and detects that the quantity of remaining tape on the supply reel is equal to TN, which corresponds to the quantity of remaining tape on the supply reel one minute before the terminal end of the tape is reached.

While the second microcomputer 16 is detecting that the rotation number of the supply reel has not reached the threshold value N according to the output signal frequency of the rotation detecting device 17, the second microcomputer 16 produces the square wave signal shown in FIG. 2(A) having a frequency of 1 Hz. However, when the rotation number of the supply reel has reached the threshold value N at a time t8, for example, the second microcomputer 16 detects at this time t8 that the rotation number of the supply reel has reached the threshold value N according to the output signal frequency of the rotation detecting device 17, and produces a signal shown in FIG. 3(A) in which the signal assumes a high level with a period of one second for 0.5 second and repeats high and low levels at a frequency of 10 Hz for 0.5 second. This signal produced from the second microcomputer 16 after the time t8 corresponds to a signal in which the low-level interval of the signal produced from the second microcomputer 16 until the time t8, which repeats high and low levels respectively having a duration of 0.5 second with a period of one second, is modulated by a pulse signal having a frequency of 10 Hz.

Accordingly, a signal having an inverted signal waveform of the signal shown in FIG. 3(A) is obtained from the NAND gate 22, and the indicator element 25 is OFF for 0.5 second after the time t8 and thereafter blinks with a frequency of 10 Hz for 0.5 second as shown in FIG. 3(B). Because the indicator element 25 is OFF for 0.5 second and thereafter blinks for 0.5 second, it may be discriminated that the recording is being carried out and that the quantity of remaining tape has become less than one minute in time according to the blinking warning indication.

Figure 6B:
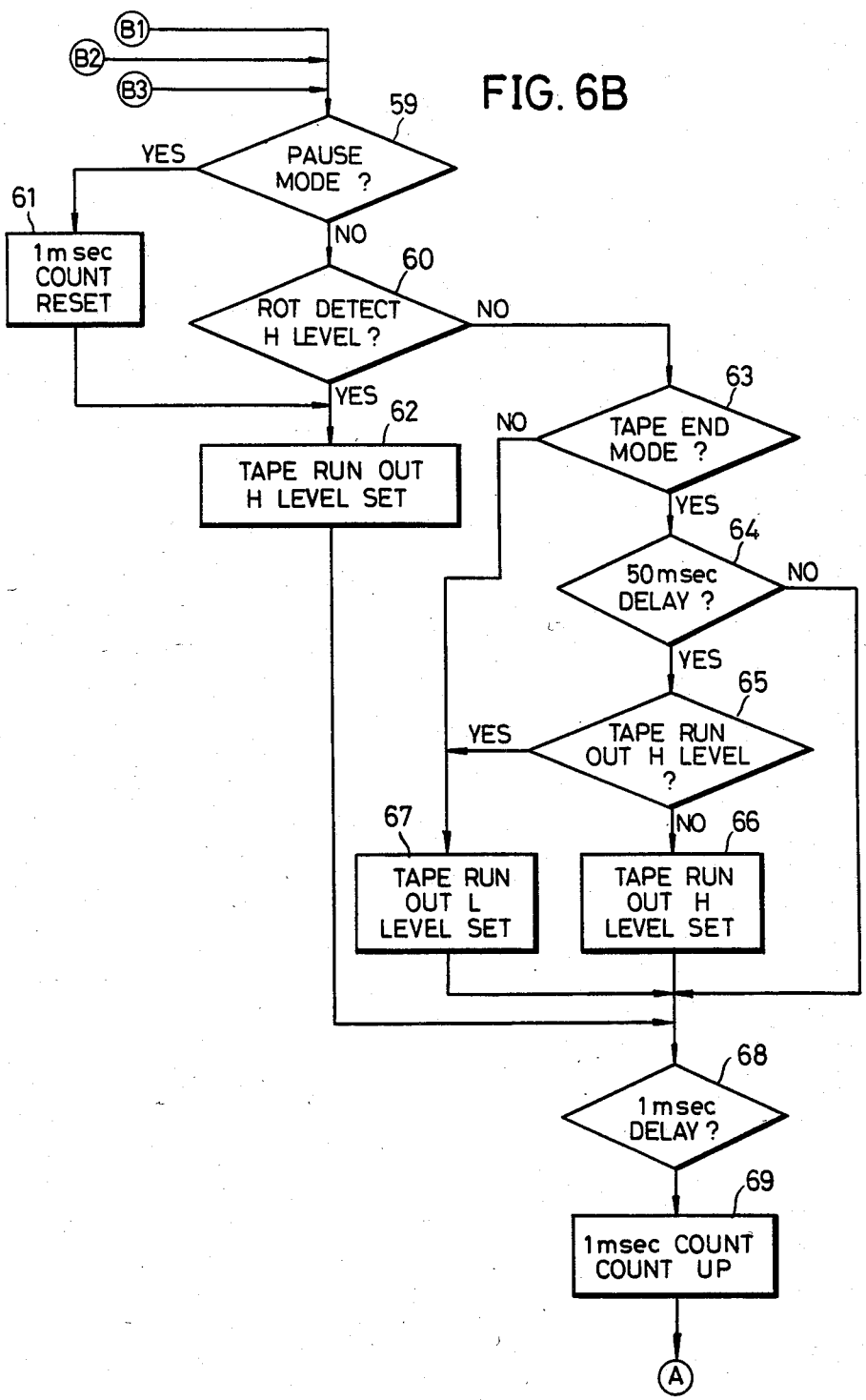

Next, a description will be given with respect to the operation of the second microcomputer 16 which produces the tape traveling output signals shown in FIGS. 2(A) and 3(A) upon receipt of the output signal of the rotation detecting device 17, by referring to FIGS. 6A and 6B. When the power source switch 11 is turned ON, the power source is turned ON at a step 51 shown in FIG. 6A, and the initial setting is carried out at a step 52. A subsequent step 53 discriminates whether the output level of the rotation detecting device 17 is high. If the discrimination result at the step 53 is "YES", the operation continues from (B1) in FIG. 6A to (B1) in FIG. 6B, and a step 59 discriminates whether the recording and/or reproducing apparatus is in the pause mode and the first microcomputer 15 is supplying a pause mode signal. When the recording and/or reproducing apparatus is not in the pause mode and the discrimination result at the step 59 is "NO", a subsequent step 60 discriminates whether the output level of the rotation detecting device 17 is high. If the discrimination result at the step 60 is "YES", the signal level of the tape traveling signal supplied to the NAND gate 22 from the second microcomputer 16 is set high at a step 62. If the recording and/or reproducing apparatus is in the pause mode and the discrimination result at the step 59 is "YES", the operation advances to a step 61. The step 61 resets a built-in 1-msec counter of the second microcomputer 16 counting for every 1 msec, and the above step 62 is subsequently carried out. After carrying out the step 62, a built-in 1 msec-timer of the second microcomputer 16 is operated at a step 68 to produce a delay of 1 msec. The counted value in the 1 msec-counter is incremented at a step 69, and the operation returns to (A) in FIG. 6A from (A) in FIG. 6B to carry out the step 53. The above 1 msec-counter is incremented for every 1 msec.

If the discrimination result at the step 53 is "NO", a step 54 discriminates that the output level of the rotation detecting device 17 has changed from high to low. If the output level of the rotation detecting device 17 remains low and the operation advances from the step 53 to the step 54, the discrimination result at the step 54 is "NO". In this case where the discrimination result of the step 54 is "NO", the operation continues to (B2) in FIG. 6A to (B2) in FIG. 6B, and the above described operations are carried out from the step 59. In the case where the supply reel rotates and the output level of the rotation detecting device 17 changes from high to low, the discrimination result at the step 54 in FIG. 6A is "YES", and the operation advances to a step 55.

The step 55 discriminates whether the counted value in the 1-msec counter is less than a specific value. If the quantity of remaining tape on the supply reel is equal to or over the predetermined quantity TN, the diameter of the tape roll on the supply reel is large. Accordingly, since the diameter of the tape roll on the supply reel is large in this case, the rotation number of the supply reel which feeds out the tape at a predetermined speed is small, and the rotational period for one revolution of the supply reel is accordingly large. Hence, in this case, the counted value in the 1-msec counter is larger than the above specific value, and the discrimination result at the step 55 is "NO". The operation then advances to a step 56 whereat the tape end mode is reset. A subsequent step 58 resets the 1-msec counter, and the operation continues to (B3) in FIG. 6B from (B3) in FIG. 6A to then carry out the step 59.

Thus, in the case where the quantity of remaining tape has not reached the predetermined quantity TN, the operation advances to the step 62 from the step 60 if the output level of the rotation detecting device 17 is high, and the output level of the second microcomputer 16 becomes high. In addition, when the output level of the rotation detecting device 17 is low, the operation advances to a step 63 from the step 60, and the step 63 discriminates whether the mode is the tape end mode. In this case, because the tape end mode is reset at the step 56, the discrimination result at the step 63 is "NO", and the signal level of the output tape traveling signal of the second microcomputer 16 is set to a low level at a step 67. The step 68 is carried out subsequent to the step 67. Hence, if the tape is traveling and the quantity of remaining tape has not reached the predetermined quantity TN, the square wave signal shown in FIG. 2(A), which repeats high and low levels according to the high and low levels of the output of the rotation detecting device 17, is supplied to the NAND gate 22 from the second microcomputer 16. The frequency of this square wave signal supplied to the NAND gate 22 gradually varies in a range between 0.8 second to 1.2 second according to the quantity of tape wound around the supply reel (diameter of the tape roll on the supply reel); however, an intermediate value is taken as an example, and this intermediate value is shown as being equal to one second in FIG. 2(A).

As the tape travel advances and the quantity of remaining tape wound around the supply reel reaches the predetermined quantity TN, the rotational period of the supply reel becomes small. Accordingly, the value counted in the 1-msec counter during one revolution of the supply reel is small, and the counted value does not reach the specific value. Thus, the discrimination result at the step 55 is "YES", and the tape end mode is set at a step 57. The step 58 is carried out subsequent to the step 57, to reset the 1-msec counter. In this case, the discrimination result at the step 63 is "YES", and a subsequent step 64 discriminates whether a delay of 50 msec has been produced. If the discrimination result at the step 64 is "NO", the operation advances to the step 68 described before. The discrimination result at the step 64 becomes "YES" when the delay of 50 msec is performed, and a step 65 discriminates whether the level of the tape traveling signal is high. When the discrimination result at the step 65 is "NO", the level of the tape traveling signal is set high at a step 66. On the other hand, when the discrimination result at the step 65 is "YES", the level of the tape traveling signal is set low at the step 67. As a result, the signal having the waveform after the time t8 shown in FIG. 3(A) is obtained from the second microcomputer 16, and supplied to the NAND gate 22.

Further, the present invention is not limited to these embodiments, but various variations and modifications may be made without departing from the scope of the present invention.

What is claimed is:

1. A state indicator device in a recording and/or reproducing apparatus having a recording manipulation switch and tape driving means for causing a tape to travel, said state indicator device comprising:

detecting means for detecting tape travel and producing a detection output;

tape traveling signal generating means for producing a tape traveling signal having a repetition frequency which is in accordance with the detection output of said detecting means;

recording mode signal generating means for generating a recording mode signal immediately when said recording manipulation switch is turned ON;

mute control signal generating means for generating a mute control signal in response to the ON state of said recording manipulation switch, said mute control signal causing a mute mode to be ON so as to mute a recording signal for a predetermine dtime period within which the traveling speed of the tape which is caused to travel by said tape driving means in a predetermined tape path reaches a predetermined tape travel speed, and causing the mute mode to be OFF so as to cancel the muting of the recording signal when said predetermined time period elapses and record the recording signal onto the tape by use of heads;

a logic circuit supplied with the tape traveling signal from said tape traveling signal generating means, the recording mode signal from said recording mode signal generating means, and the mute control signal from said mute control signal generating means, for producing a first driving signal for causing continuous emission of light when said recording mode signal exists and said mute control signal is in a signal state for causing the mute mode to be ON, and producing a second driving signal in accordance with said tape traveling signal when said recording mode signal exists and said mute control signal is in a signal state for causing the mute mode to be OFF; and a single visual indicator element for continuously emitting light in response to the output first driving signal of said logic circuit so as to indicate a state in which said recording manipulation switch is turned ON but the recording signal is muted, said single visual indicator element blinking at the repetition frequency of said tape traveling signal in response to the output second driving signal of said logic circuit so as to indicate a state in which a recording operation is carried out with the tape traveling at said predetermined tape travel speed.

2. A state indicator device as claimed in claim 1 in which said logic circuit comprises a first logic gate supplied with said tape traveling signal and said mute control signal, and a second logic gate supplied with said recording mode signal and an output of said first logic gate, and said second logic gate produces said first and second driving signals.

3. A state indicator device as claimed in claim 2 in which said tape traveling signal is a signal which repeatedly assumes high and low levels with a frequency in accordance with a quantity of remaining tape wound around a supply reel during tape travel, said mute control signal is a signal which assumes low level in a state where the mute mode is ON and assumes high level in a state where the mute mode is OFF, said recording mode signal is a signal which assumes high level during the recording mode, said first logic gate is a NAND-gate, and said second logic gate is an AND-gate.

4. A state indicator device as claimed in claim 1 in which said recording mode signal generating means and said mute control signal generating means are constituted by a single microcomputer.

5. A state indicator device as claimed in claim 1 in which said recording and/or reproducing apparatus further comprises a recording pause switch for temporarily interrupting the recording operation to put said recording and/or reproducing apparatus in a recording pause mode, said mute control signal generating means causes said mute control signal to assume a signal state for causing the mute mode to be ON and mute the recording signal when said recording pause switch is turned ON, and said logic circuit produces said first driving signal regardless of said tape traveling signal according to the signal state of said mute control signal when said recording pause switch is turned ON.

6. A state indicator device as claimed in claim 1 in which said recording and/or reproducing apparatus further comprises means for releasing said recording and/or reproducing apparatus from the recording pause mode and resuming the recording operation, said mute control signal generating means generates a mute control signal according to the release of said recording and/or reproducing apparatus from the recording puase mode, for causing the mute mode to be ON so as to mute the reproducing signal for a predetermined time period within which the traveling speed of the tape which is caused to travel by said tape driving means in the predetermined tape path reaches said predetermined tape travel speed, and causing the mute mode to be OFF so as to cancel the muting of the recording signal when said predetermined time period elapses and recording the recording signal onto the tape by use of the heads.

7. A state indicator device as claimed in claim 1 in which said tape traveling signal generating means detects that a quantity of remaining tape wound around a supply reel has become less than a predetermined quantity according to the detection output of said detecting means and generates a tape traveling signal with a signal waveform having a frequency different from said repetition frequency, and said indicator element undergoes a blinking operation with a frequency different from the blinking operation with said repetition frequency so as to provide a warning indication that the quantity of remaining tape on the supply reel has become less than said predetermined quantity.

8. A state indicator device as claimed in claim 1 in which said detecting means produces a tape travel detection output according to the rotation of a supply reel, said tape travel detection output is a signal having a frequency corresponding to a rotation number indicative of the speed of rotation of the supply reel which rotation number is in accordance with a quantity of remaining tape wound around said supply reel, and said tape traveling signal generating means generates a first tape traveling signal having said repetition frequency according to the frequency of said tape travel detection output when the rotation number indicative of the speed of rotation of said supply reel has not reached a predetermined rotation number N, where N is an integer, and generates a second tape traveling signal having a frequency different from said repetition frequency when the rotation number indicative of the speed of rotation of said supply reel reaches said predetermined rotation number N.

9. A state indicator device as claimed in claim 8 in which said second tape traveling signal is a signal having said repetition frequency in which a signal having a frequency higher than said repetition frequency exists in an interval corresponding to half the period of said second tape traveling signal.

* * * * *